Patented Oct. 5, 1954

2,691,020

UNITED STATES PATENT OFFICE 2,691,020

TRIAZINE VAT DYES

Ramon A. Gadea, Marietta, Ohio, and Wendell P. Munro, Martinsville, N. J., assignors to American Cyanamid Company, New York, N. Y., a corporation of Maine No Drawing. Application April 10, 1953,
Serial No. 348,118

14 Claims. (Cl. 260—249)

This invention relates to the preparation of a new class of aryltriazine vat dyestuffs, and to a new process for preparing them.

In the past a number of 2-aryl-4,6-dianthraquinonyl amino triazines have been prepared and constitute vat dyestuffs, many of which have desirable properties (Hentrich, Patent No. 1,897,-428). More recently, an excellent process was developed by which some of these vat dyestuffs may be prepared, which involves five steps. In the first step an aroyl chloride is reacted with dicyandiamide to produce an aroyl dicyandiamide. This is hydrolyzed to the corresponding aroyl biuret, ring closed by means of alkali to form a 2-aryl-4,6-dihydroxytriazine (also known as an aroyl guanamide) which can then be transformed into the corresponding 2-aryl-4,6-dichlorotriazine by means of phosphorus pentachloride. This dichloro compound is condensed with aminoanthraquinones to form the finished dyestuff. The first four steps of the above synthesis are described in the patents of Kaiser and Thurston, No. 2,407,161; Adams, 2,401,599; in an article by Ostrogovitch, Gazz. Chim. Ital., 62, 229 (1935); and in the Hentrich patent referred to above. They may be represented by the following formulas:

RCOCl + NH₂(C:NH)NHCN ⟶

RCONHC(:NH)NHCN $\xrightarrow{\text{(acid)}}$ RCONHCONHCONH₂ $\xrightarrow{\text{(alkali)}}$

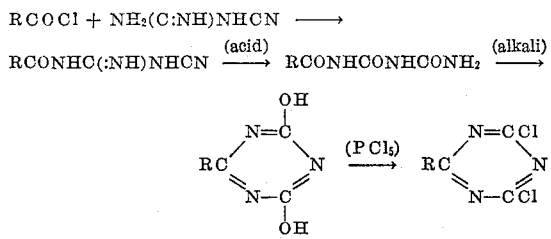

The above reactions, which are quite general, fail in one particular case where R is an o-hydroxyaryl group. When it is attempted to prepare such compounds, side reactions occur and the triazine ring does not close. It has therefore been impossible, in the past, to produce a 2-o-hydroxyaryltriazine, and the anthraquinonyl amino dyestuffs derived therefrom.

According to the present invention it has been found that such compounds can be prepared, and particularly the 2-o-hydroxy-aryl-4,6-dianthraquinonylamino derivatives having the formula:

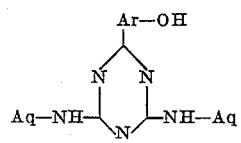

in which Ar is an o-arylene radical and Aq is an alpha-anthraquinonyl radical. The new process involves preparing an entirely different compound, namely, a 2-alkoxyaryl-4,6-dianthraquinonylamino triazine having the following formula:

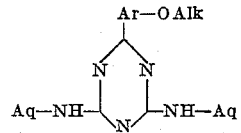

where Alk is a lower alkyl group, i. e., one having less than 6 carbon atoms. These compounds can be produced by the general processes described above and in the above referred to patents and article. The alkoxy compounds can then be dealkylated by a hydrogen halide having a molecular weight greater than 20 such as hydrogen chloride, bromide or iodide.

The splitting off of the alkyl group may be carried out under a wide variety of reaction conditions. It is an advantage of the present invention that the process is in no way critical. In general, it is desirable to disperse the alkoxyaryl triazine in an organic solvent and pass hydrogen halide vapors therethrough at elevated temperature with thorough stirring. The reaction proceeds smoothly giving a high yield without appreciable side reactions except, of course, that if the anthraquinone nuclei contain substituents sensitive to acid under reaction conditions such, for example, as alpha-alkoxy groups, these will also be split, producing a corresponding hydroxy-substituted dyestuff. The organic solvents may be aromatic or aliphatic and are preferably not too volatile so as to eliminate the necessity of expensive pressure equipment. Typical organic solvents are: chlorobenzene; the xylenes; o-dichlorobenzene; nitrobenzene; propylene dichloride; tetrahydronaphthalene; 1-chloronaphthalene; tetrachloroethylene; and the like.

The conditions under which dealkylation takes place by means of the hydrogen halide are not critical. The temperatures may vary widely although economically useful reaction rates are normally not obtainable materially below 80° C. From 100–200° C. excellent results are obtained although at the higher temperatures the solubility of the hydrogen halide in the organic solvent decreases and temperatures more nearly in the middle of the range are ordinarily preferred in practical operation. 200° C. is about as high a temperature as can be used because excessive temperatures also tend to produce some decomposition of the starting material or final product.

It is an advantage of the present invention that the 2-o-alkoxyaryl-4,6-dianthraquinonylamino triazines do not have to be isolated. In fact, dealkylation can be effected in the same medium in which the condensation of the dichlorotriazine and aminoanthraquinone takes place.

The reaction by which the alkoxy compound is transformed into the hydroxy compound is moderately slow. The length of time, of course, will vary with batch size, stirring efficiency, temperature, and other factors as is normal in batch operations. It is, however, not excessive and even large batches take no more than a few hours. The output of equipment is therefore satisfactorily high.

Isolation of the final product presents no problem as side reactions are subtantially absent and the product is obtained in high yield and good purity. This is rather surprising as the triazine ring which is sensitive to acidic reagents appears to be unusually stable in the dealkylation reaction. This is unique with the o-alkoxyaryl compounds because the reaction does not occur with meta- or para-alkoxy groups. It is not known why the o-alkoxyaryl compounds show the property of smooth dealkylation with hydrogen halides and it is not intended to limit the invention to any theory of this anomalous behavior of the o-alkoxy group.

The alkoxy compounds may be prepared from a large number of o-alkoxyaroyl chlorides. Thus, for example, the chlorides of such acids as o-anisic acid, o-ethoxybenzoic acid, 2-methoxy-3-naphthoic acid, o-propoxybenzoic acid, 4-chloro-2-methoxybenzoic acid, 5-bromo-2-propoxybenzoic acid, 4-methyl-2-methoxybenzoic acid, 5 - nitro-4-methyl - 2 - methoxybenzoic acid, 1-methoxy-2-naphthoic acid, 4-nitro-1-methoxy-2-naphthoic acid, 1-methoxyphenanthrene-2-carboxylic acid (Duvall and Mosettig, J. A. C. S. 60, 2409 (1938)), 3-methoxyphenanthrene-2-carboxylic acid (Gilman and Cook, J. A. C. S. 62, 2813 (1940)), or the like may be used. The alpha-aminoanthraquinones which are condensed with the dichlorotriazine include not only unsubstituted alpha-aminoanthraquinone but various substituted products including fused ring and heterocyclic derivatives. Typical compounds are 1-aminoanthraquinone, 2-methyl-1-aminoanthraquinone, 4-methyl-1-aminoanthraquine, 6-methyl - 1 - aminoanthraquinone, 3-chloro-1-aminoanthraquinone, 3-bromo-1-aminoanthraquinone, 5 - chloro - 1 - aminoanthraquinone, 5-benzoylamino-1-aminoanthraquinone, 4- and 5-aminoanthraquinone-1(N), 2-benzacridones, 4- and 5-aminoanthraquinone-1(S), 2 - thioxanthones, 4-aminoanthrapyramidine, 4-amino-2,3-benzanthraquinone, and the like.

The 2-o-hydroxyaryl-4,6-anthraquinonylamino triazines of the present invention constitute a new series of vat dyestuffs of various shades and excellent properties. The introduction of the o-hydroxyl group results in notable improvements in the properties of the dyestuffs. First, in general, the shades are materially brighter and there is a considerable hypsochromic shift when compared with the unsubstituted compounds. For example, the hydroxy group transforms a reddish yellow dye into a much cleaner and greener yellow. This shade shift is of marked practical value and is quite out of keeping with the normal effects obtained by the introduction of hydroxy groups which ordinarily are bathochromic in their effect. It is not known why in the triazine dyes of the present invention the effect of the hydroxyl group is just the opposite of that which is normally noticed in other types of dyestuff and, accordingly, the invention is not intended to be limited to any particular theory.

The second advantageous property which is possessed by the dyestuffs having the o-hydroxyl group is a marked improvement in fastness to light and to washing. This again is quite different from the ordinary effects obtained by the introduction of hydroxyl groups. Usually these groups lower the fastness, particularly to washing and soda ash boil. As in the case of the anomalous shade changes referred to above, it is not known why the hydroxyl groups behave in an unusual manner in the triazine dyes of the present invention.

A third advantage of the dyestuffs of the present invention is their unusual chemical stability under a variety of reaction conditions which permits their conversion into other dyestuffs even when severe reaction conditions are encountered. The compounds of the present invention, therefore, also constitute starting materials or intermediates for further series of dyestuffs opening up a new and extended field to the vat dye chemist.

While the present invention covers broadly any of the compounds coming under the general type formula listed above, we have found that a more limited group are particularly desirable. These compounds are represented by the following type formula:

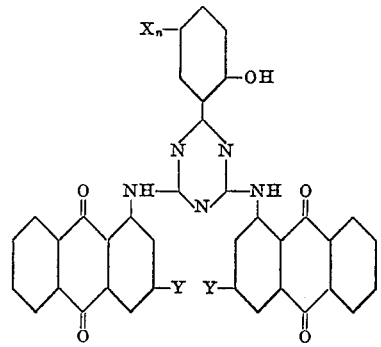

in which X and Y are hydrogen or chlorine and $n$ is a positive integer less than 3. These constitute a preferred subgenus.

The invention will be described in greater detail in the following specific examples, the parts being by weight unless otherwise specified. As some of the intermediate compounds are new, examples of their preparation are included, as well as examples for the production of the finished dyestuffs themselves.

EXAMPLE 1 o-Methoxybenzoyldicyandiamide

A slurry of 120 parts of acetone and 21 parts of dicyandiamide is cooled to 5–10° C. and treated with 26.4 parts of potassium hydroxide. After stirring at 0–5° C. until the reaction is substantially complete, the mixture is cooled below 0° C. and there is slowly added to it a solution of 34.1 parts of o-methoxybenzoyl chloride in 120 parts of acetone. Stirring is then continued until the reaction mixture comes to room temperature. It is diluted to approximately the volume of 1000 parts of water, and slowly acidified with approximately 14 parts of acetic acid. The resulting product is stirred thoroughly, filtered, washed, and air dried. It melts approximately at 186° C.

EXAMPLE 2 o-Methoxybenzoylbiuret

A mixture of 80 parts of o-methoxybenzoyldicyandiamide, prepared as described in Example 1, 400 parts of water, and 67 parts of concentrated hydrochloric acid is gradually heated to reflux with stirring, and refluxed until biuret formation is complete. The slurry is then cooled to 0–5° C. and filtered. The product is washed with very dilute hydrochloric acid and air dried. It melts approximately at 185° C.

EXAMPLE 3 o-Methoxybenzoguanamide 54.3 parts of o-methoxybenzoylbiuret, prepared as in Example 2, is dissolved in a solution of 30.2 parts potassium hydroxide in 600 parts water, and stirred at room temperature until ring closure has been effected, the reaction being slower than in the two preceding examples. The product is precipitated by careful acidification with approximately 21 parts of acetic acid, and then cooled and filtered. It melts approximately at 250° C.

EXAMPLE 4

2-o-methoxyphenyl dichlorotriazine

A mixture of 10 parts of o-methoxybenzoguanamide, prepared as in Example 3, 21 parts phosphorus pentachloride, and 46 parts phosphorus oxychloride, is refluxed until chlorination is complete. The product is then drowned rapidly in about 800 parts of a mixture of ice and water, stirred vigorously, filtered, washed, and dried. It may be purified by dissolving in benzene, filtering, and evaporating to dryness. It melts approximately at 136° C.

EXAMPLE 5

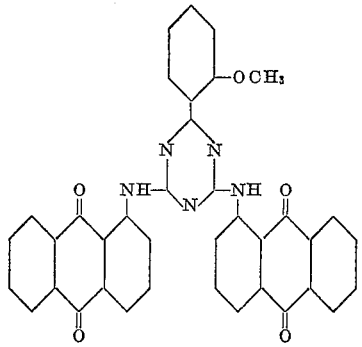

A mixture of 128 parts of 2-(o-methoxyphenyl)-4,6-dichlorotriazine, prepared as in Example 4, 223 parts of alphaaminoanthraquinone, and 1200 parts of nitrobenzene, is stirred and heated at 120° C. until the condensation is effected. It is then allowed to cool to room temperature and filtered. The product is washed with nitrobenzene and alcohol, and then dried at 60° C.

EXAMPLE 6

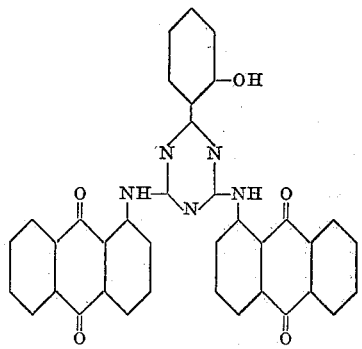

A slurry of 30 parts of product of Example 5 in 360 parts of nitrobenzene is stirred and heated to 135° C. A vigorous stream of dry hydrogen chloride gas is passed through the mixture for a few minutes at intervals, while the mixture is stirred and gradually heated to 200° C. The mixture is then cooled and filtered. The product is washed with nitrobenzene and alcohol, and dried at 60° C. It is a very bright greenish shade yellow of excellent fastness and high color strength. It dyes well on rayon and wool as well as cotton, and can be acid pasted in the normal manner from concentrated sulfuric acid.

EXAMPLE 7

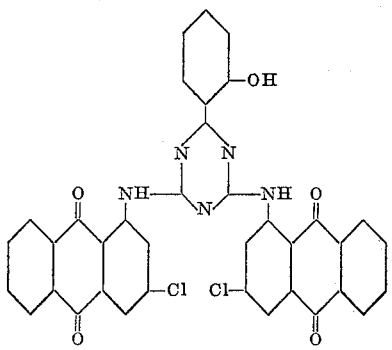

A mixture of 15.0 parts of o-methoxyphenyl dichlorotriazine and 25.3 parts of 3-chloro-1-aminoanthraquinone in 260 parts of o-dichlorobenzene is heated to 140° C. and stirred at this temperature until condensation is complete. The reaction mixture is then cooled and filtered. The product is washed with o-dichlorobenzene followed by alcohol. An excellent yield is obtained; the product is demethylated as follows:

46 parts of the reaction product is slurried in 520 parts of o-dichlorobenzene, stirred and heated to 140° C., and treated with a stream of dry hydrogen bromide at this temperature until dealkylation is effected. The mixture is then cooled and filtered. The product is washed with o-dichlorobenzene, followed by alcohol and water. An excellent yield is obtained. The product dyes cotton and rayon bright greenish-yellow shades from a light red colored vat showing excellent fastness to light, chlorine and washing. The dyestuff can be acid pasted in the normal way from concentrated sulfuric acid.

Similar results are obtained under the same reaction conditions if a stream of hydrogen iodide is used instead of hydrogen bromide.

EXAMPLE 8

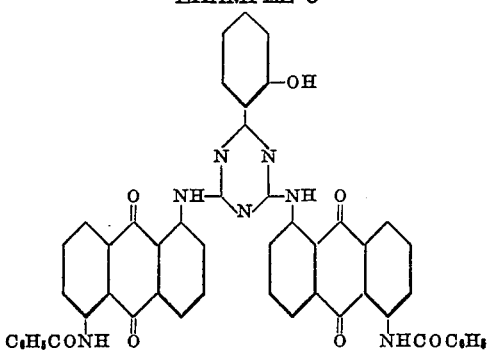

A mixture of 6.4 parts of o-methoxyphenyl dichlorotriazine and 17.1 parts of 5-benzoylamino-1-aminoanthraquinone in 180 parts of nitrobenzene is stirred at 140-150° C. until condensation is substantially complete. The resulting yellow slurry is cooled to room temperature and filtered. The product is washed with nitrobenzene and then with alcohol and dried. A very high yield is obtained. Demethylation is effected in the usual way. The resulting dyestuff gives orange-yellow shades of excellent fastness properties on cellulosic fibers.

EXAMPLE 9

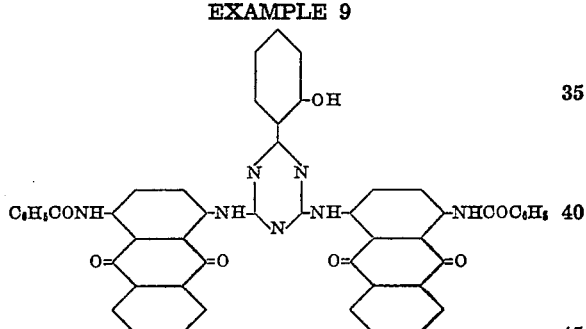

4-benzoylamino - 1 - aminoanthraquinone and o-methoxyphenyl dichlorotriazine are reacted according to the procedure of the preceding example. Demethylation is carried out as follows:

10 parts of the reaction product is slurried in 130 parts of o-dichlorobenzene containing one part of pyridine, stirred and heated to 150° C., and treated at this temperature with a stream of dry hydrogen chloride until dealkylation is effected. The mixture is then cooled and filtered, the product being washed with o-dichlorobenzene, alcohol and water. A very high yield is obtained. The product gives red cotton and rayon dyeings from a dull violet-brown vat. It shows excellent fastness to light, chlorine and washing.

EXAMPLE 10

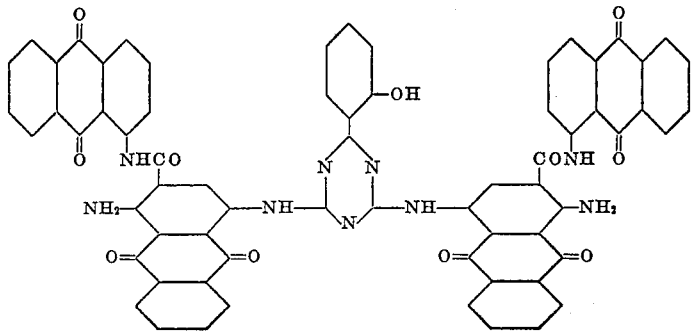

A mixture of 4.1 parts of 1,4-diaminoanthraquinone-2-carboxy - anthraquinonyl - amide and 1.1 parts of o-methoxyphenyl dichlorotriazine in 50 parts of nitrobenzene is heated to 140-150° C. to effect condensation and then cooled and filtered. Demethylation is carried out with hydrogen chloride in nitrobenzene in the usual manner described above. A substantially theoretical yield is obtained of a dyestuff which dyes blue-gray shades on cellulose fibers from a bordeaux red vat.

EXAMPLE 11

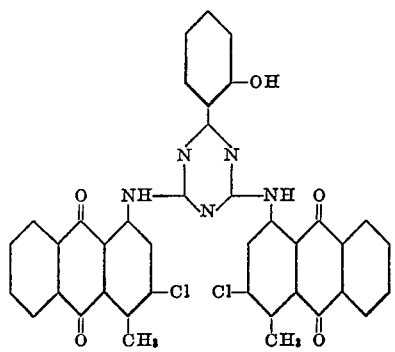

A mixture of 6.4 parts of o-methoxyphenyl dichlorotriazine and 13.6 parts of 3-chloro-4-methyl-1-aminoanthraquinone in 180 parts of nitrobenzene is heated to 140-150° C. and stirred at this temperature until condensation is complete. The resulting olive yellow slurry is cooled and filtered. The product is washed with nitrobenzene followed by alcohol. An excellent yield is obtained. Demethylation is effected by the procedure described above. The product gives yellow dyeings on cotton.

EXAMPLE 12

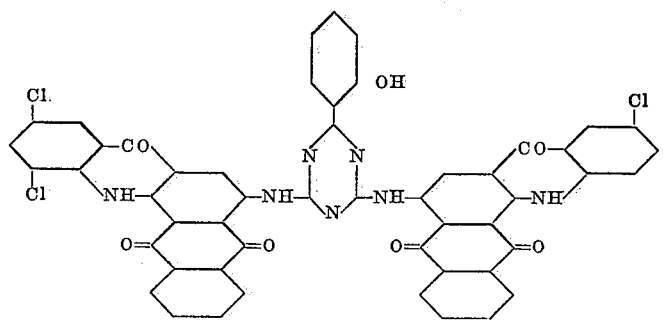

A mixture of 3.1 parts of 4-amino-Bz 3,5-dichloroanthraquinone benzacridone and 1.0 part of o-methoxyphenyl dichlorotriazine in 30 parts of nitrobenzene is heated and stirred at approximately 130° C. until condensation is complete. The product is filtered and washed with nitrobenzene followed by alcohol. An excellent yield is obtained.

Demethylation is carried out by slurrying 2.0 parts of this product in 35 parts of o-dichlorobenzene at 140° C. and treating with a stream of gaseous hydrogen bromide until demethylation is complete. The product is then filtered and washed. It gives bright greenish-blue dyeings on cotton from a violet vat.

EXAMPLE 13

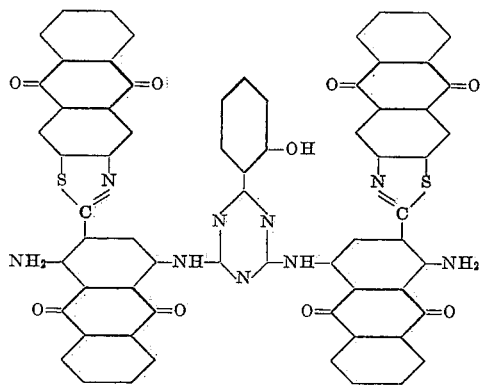

A slurry of 8.0 parts of 1,4-diamino-2-(2,3-anthraquinone thiazolyl)-anthraquinone in 180 parts of nitrobenzene is stirred at 120–125° C. until thoroughly dispersed and then treated with a solution of 2.1 parts of o-methoxyphenyl dichlorotriazine in 12 parts of nitrobenzene. The mixture is stirred at 130–140° C. to effect condensation and cooled. The product is filtered and washed with nitrobenzene and alcohol. An excellent yield is obtained. Demethylation is carried out by the procedure of the preceding examples. The product gives greenish-blue dyeings from a blue-violet vat.

EXAMPLE 14

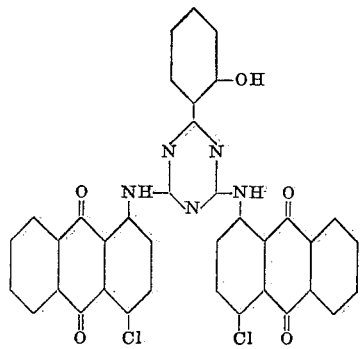

A mixture of 10.3 parts of o-methoxyphenyl dichlorotriazine, 20.6 parts of 1-amino-4-chloroanthraquinone, and 310 parts of o-dichlorobenzene is heated to 140° C. until condensation is substantially complete. The product is then cooled, filtered, and washed with o-dichlorobenzene followed by alcohol. Demethylation is carried out by the procedure described in the preceding examples.

EXAMPLE 15

*o-Ethoxybenzoyldicyandiamide*

A mixture of 31.5 parts of dicyandiamide and 39.6 parts of potassium hydroxide in 145 parts of acetone is cooled to 0–10° C., stirred until a flocculent precipitate forms, and gradually treated with a solution of 55.2 parts of o-ethoxybenzoyl chloride in 120 parts of acetone. The mixture is diluted with water, acidified with about 37 parts of glacial acetic acid, and filtered. An excellent yield is obtained. The product melts at approximately 236° C.

EXAMPLE 16

*o-Ethoxybenzoylbiuret*

A mixture of 61.2 parts of o-ethoxybenzoyldicyandiamide (prepared as in the preceding example), 39 parts of concentrated hydrochloric acid and 250 parts of water is refluxed to produce biuret. The product is cooled, filtered, washed, and dried. A good yield is obtained. It melts at about 205° C.

EXAMPLE 17

*o-Ethoxybenzoguanamide*

54.5 parts of o-ethoxybenzoylbiuret (prepared as in the preceding example) is stirred for an extended period in a solution of 34.2 parts of potassium hydroxide in 780 parts of water. The solution is then acidified with 36.7 parts of glacial acetic acid, stirred thoroughly and filtered. The product is washed acid free and dried. An excellent yield is obtained. It melts at approximately 246° C.

EXAMPLE 18

*o-Ethoxyphenyl dichlorotriazine*

A mixture of 41.0 parts of o-ethoxybenzoguanamide (prepared as in the preceding example), 195 parts of phosphorous oxychloride, and 73.5 parts of phosphorous pentachloride, is heated under reflux until a clear solution is obtained. The solution is refluxed one-half hour longer and then drowned in ice water. The product is filtered, washed thoroughly, and dried at 60° C. It is purified by dissolving in benzene, filtering, and evaporating to dryness. A good yield is obtained.

EXAMPLE 19

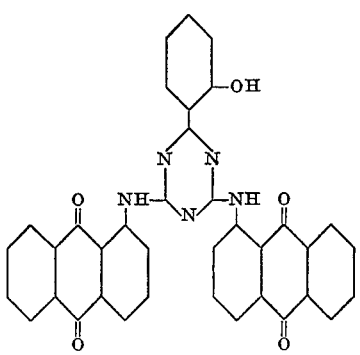

A mixture of 2.6 parts of o-ethoxyphenyl dichlorotriazine (prepared as in the preceding example), and 4.5 parts of 1-aminoanthraquinone in 72 parts of nitrobenzene is gradually heated to 130° C. and maintained at this temperature until condensation is complete. The product is cooled, filtered, and washed with nitrobenzene. A good yield is obtained. De-ethylation is carried out by slurrying 2.0 parts of the product in 35 parts of nitrobenzene and gradually heating to 180–200° C. while treating with a stream of hydrogen chloride. The product is then cooled, filtered, washed and dried. It is identical with the product of Example 6.

EXAMPLE 20

*2-methoxy-5-chlorobenzoyldicyandiamide*

28 parts of 2-methoxy-5-chlorobenzoic acid is converted to acid chloride in the ordinary way by treatment with thionyl chloride, the reaction being completed by gradual heating followed by removal of excess thionyl chloride under reduced pressure. The resulting product is dissolved in 40 parts of acetone.

A mixture of 23.4 parts of dicyandiamide, 136 parts of acetone and 1.5 parts of water is cooled to 0° C., treated with 19.6 parts (pure basis) of flake potassium hydroxide, stirred thoroughly at approximately 0° C., and slowly treated with the above prepared acetone solution of 2-methoxy-5-chlorobenzoyl chloride. The resulting slurry is drowned in ice water and made weakly acidic with dilute sulfuric acid. The product is then filtered and washed free of acid. A good yield is obtained. It melts at approximately 220° C. with decomposition.

EXAMPLE 21

*2-methoxy-5-chlorobenzoylbiuret*

A solution of 3 parts of 99% sulfuric acid in 70 parts of water is added to 5.0 parts of the above prepared 2-methoxy-5-chlorobenzoyldicyandiamide, which is first wetted with 12 parts of ethanol. The mixture is then refluxed until the reaction is complete, the alcohol being allowed to distill out. The product is cooled, filtered, and dried at 60° C. A good yield is obtained of product melting approximately 198° C. with decomposition.

EXAMPLE 22

*2-methoxy-5-chlorobenzoguanamide*

A mixture of 4.4 parts of the above prepared 2-methoxy-5-chlorobenzoylbiuret, 2.5 parts of sodium hydroxide, and 50 parts of water is stirred until ring closure takes place and allowed to stand overnight. The solution is filtered and weakly acidified with 20° Bé. hydrochloric acid. The resulting slurry is cooled in an ice water bath and filtered. A good yield is obtained. The product melts approximately 250° C. with decomposition.

EXAMPLE 23

*2-methoxy-5-chlorophenyl dichlorotriazine*

A mixture of 3.3 parts of the above prepared 2-methoxy-5-chlorobenzoguanamide, 6.3 parts of phosphorous pentachloride, and 17 parts of phosphorous oxychloride is refluxed until chlorination is completed, drowned in about 250 parts of ice and water, and stirred for 1 hour. The product is filtered, washed, and dried at 60° C. If desired, it can be purified by extraction with benzene followed by evaporation. It melts at approximately 156° C.

EXAMPLE 24

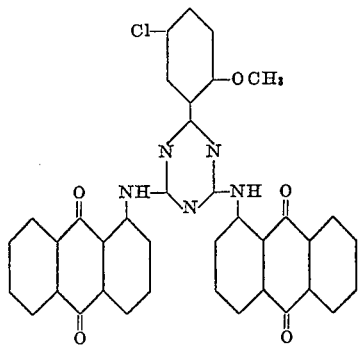

A mixture of 1.2 parts of the above prepared 2-methoxy-5-chlorophenyl dichlorotriazine, 1.9 parts of alpha-aminoanthraquinone, and 36 parts of nitrobenzene is heated to 100–110° C., stirred at this temperature until the condensation reaction is finished, and filtered. The product is washed with nitrobenzene followed by alcohol, and dried. A good yield is obtained.

EXAMPLE 25

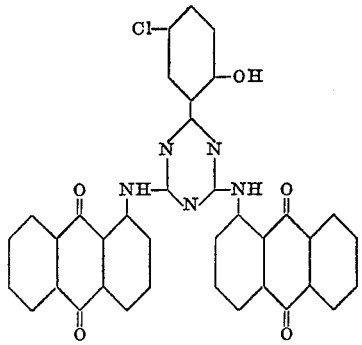

A mixture of 1.6 parts of the product of the preceding example and 26 parts of o-dichlorobenzene is heated to 140° C. and treated with a stream of dry hydrogen bromide until dimethylation is complete. The mixture is cooled and filtered, the product being washed with o-dichlorobenzene followed by alcohol. A good yield is obtained. It dyes brilliant yellow shades from a claret vat.

EXAMPLE 26

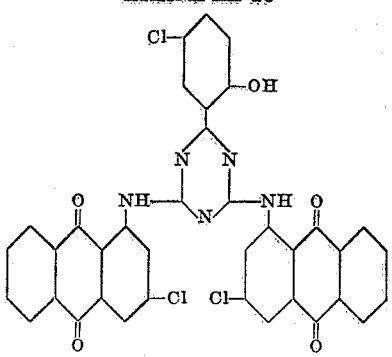

A mixture of 1.4 parts of 2-methoxy-5-chlorophenyl dichlorotriazine and 2.6 parts of 1-amino-3-chloroanthraquinone in 40 parts of o-dichlorobenzene is heated at 120–145° C. until condensation is effected, cooled, and filtered. The product is washed with o-dichlorobenzene, slurried in 40 parts of the same solvent, and dimethylated with a stream of dry hydrogen bromide gas at a temperature of 140–150° C. The product is cooled, filtered, and washed with dichlorobenzene and alcohol. It dyes brilliant greenish-yellow shades.

EXAMPLE 27

*2-methoxy-5-methylbenzoyldicyandiamide*

A mixture of 24.4 parts of dicyandiamide, 136 parts of acetone, and 1.5 parts of water is cooled to 0° C., treated with 20.2 parts (pure basis) of potassium hydroxide, and stirred until the reaction is finished. There is then gradually added at this temperature a solution in 27 parts of acetone of the acid chloride prepared in the usual way from 24.8 parts of 2-methoxy-5-methylbenzoic acid by reacting with thionyl chloride.

After addition of the acid chloride, the slurry is stirred until acylation is complete at 0° C., drowned in ice water, made weakly acid with sulfuric acid, and filtered. A good yield of product is obtained, melting at about 200° C.

EXAMPLE 28

*2-methoxy-5-methylbenzoylbiuret*

Five parts of the above prepared 2-methoxy-5-methylbenzoyldicyandiamide is pasted with 8 parts of ethanol, treated with a solution of 3 parts of 99% sulfuric acid in 70 parts of water, heated to reflux, distilling out the alcohol, and heated at 98° C. to effect the transformation to the biuret. The reaction mixture is then cooled and filtered. The product is washed with cold water and dried at 60° C. It melts at approximately 199° C. with decomposition.

EXAMPLE 29

*2-methoxy-5-methylbenzoguanamide*

A solution of 4.2 parts of 2-methoxy-5-methylbenzoylbiuret and 2.5 parts of sodium hydroxide in 50 parts of water is stirred until ring closure takes place, allowed to stand overnight at room temperature, filtered, and acidified weakly with hydrochloric acid. The resulting slurry is cooled and filtered. The product is washed with ice water and dried. It melts at approximately 238° C.

EXAMPLE 30

*2-methoxy-5-methylphenyl dichlorotriazine*

A mixture of 3.3 parts of the above prepared 2-methoxy-5-methylbenzoguanamide and 45 parts of phosphorus oxychloride is refluxed until chlorination is complete, cooled, drowned in 300 parts of ice water, and filtered. The product is dried and can be purified by extraction with benzene. It melts at approximately 130° C.

EXAMPLE 31

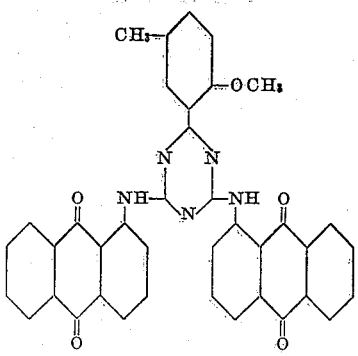

A mixture of 1.3 parts of the above prepared 2-methoxy-5-methylphenyl dichlorotriazine and 2.0 parts of alpha-aminoanthraquinone in 40 parts of nitrobenzene is stirred at 100–110° C. until condensation is complete, and filtered. The product is washed with nitrobenzene followed by alcohol. A good yield is obtained.

EXAMPLE 32

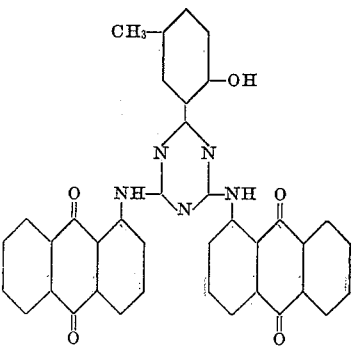

A slurry of 1.6 parts of the product of the previous example in 26 parts of o-dichlorobenzene is heated to 140° C. and treated with a stream of hydrogen bromide to effect demethylation. The slurry is then cooled and filtered. The product is washed with dichlorobenzene followed by alcohol, and dried at 100° C. It gives brilliant yellow dyeings from a claret vat.

EXAMPLE 33

*2-methoxy-3-naphthoyldicyandiamide*

A mixture of 43.7 parts of dicyandiamide in 400 parts of acetone and 4 parts of water is stirred, cooled to 0° C., treated with 40 parts of potassium hydroxide of 90% purity, stirred at 0° C. to obtain the potassium salt, and gradually treated with a solution of 59.5 parts of 2-methoxy-3-naphthoyl chloride in 50 parts of acetone. The reaction is completed by additional stirring at 0° C. The mixture is then drowned in 1500 parts of water containing 750 parts of ice and 36 parts of concentrated sulfuric acid. The product is washed and dried. An excellent yield is obtained. The melting point is around 222° C.

EXAMPLE 34

*2-methoxy-3-naphthoylbiuret*

A solution of 6 parts of 99% sulfuric acid in 140 parts of water is added to 10.0 parts of the above prepared 2-methoxy-3-naphthoyldicyandiamide which has been wet with 20 parts of alcohol. The resulting slurry is refluxed until biuret formation is complete, the alcohol being distilled out, and then cooled and filtered. A good yield is obtained.

EXAMPLE 35

*2-methoxy-3-naphthoguanamide*

A slurry of 4.8 parts of the above prepared 2-methoxy-3-naphthoylbiuret and 2.5 parts of sodium hydroxide in 50 parts of water is stirred until solution is complete, and allowed to stand overnight. The solution is then filtered, and weakly acidified by the careful addition of 20° Bé. hydrochloric acid. The yellow product is filtered and dried at 50–60° C. A good yield is obtained.

EXAMPLE 36

*2-methoxy-3-naphthyl dichlorotriazine*

A mixture of 1.8 parts of the above prepared 2-methoxy-3-naphthoguanamide, 3.2 parts of phosphorus pentachloride, and 34 parts of phosphorus oxychloride is refluxed to effect chlorination, allowed to stand overnight, and drowned in ice water with thorough stirring. The product is filtered, washed with ice water, and dried at 50–60° C. It melts at about 197° C. with decomposition.

EXAMPLE 37

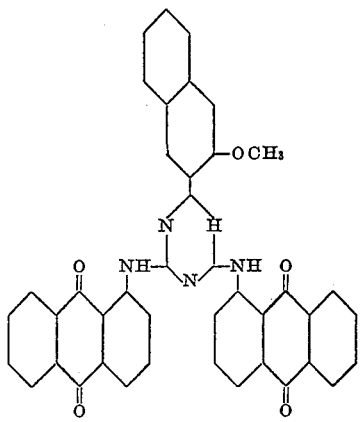

A mixture of 1.5 parts of the above-prepared 2-methoxy-3-naphthyl dichlorotriazine, 2.2 parts of alpha-aminoanthraquinone, and 30 parts of nitrobenzene is heated at 100–105° C. until condensation is finished, and filtered. The product is washed with nitrobenzene followed by alcohol.

EXAMPLE 38

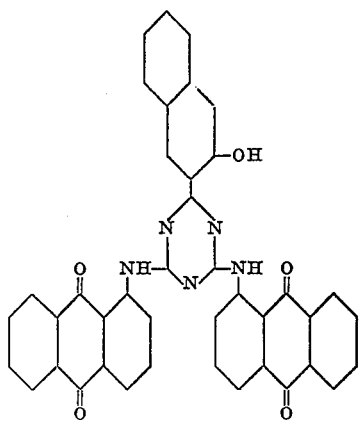

A mixture of 1.8 parts of the product of the preceding example in 26 parts of o-dichlorobenzene is stirred, heated at approximately 140° C., and treated with a stream of dry hydrogen bromide until demethylation is complete. The resulting thick slurry is filtered. The cake is washed with o-dichlorobenzene followed by alcohol, and dried at 50–60° C. The yield is excellent. It gives brilliant yellow dyeings from a claret vat.

EXAMPLE 39

*2,4-dimethoxybenzoyldicyandiamide*

A mixture of 24.4 parts of dicyandiamide, 136 parts of acetone, and 1.5 parts of water is cooled to 0° C., treated with 22.4 parts of flake potassium hydroxide, stirred until potassium salt is formed and treated gradually with a solution prepared by reacting 27.3 parts of 2,4-dimethoxybenzoic acid in the usual way with 21.4 parts of thionyl chloride, removing excess thionyl chloride in vacuo, and dissolving the resulting acid chloride in 30 parts of acetone.

The reaction mixture is stirred at approximately 0° C. to complete the reaction, and drowned in ice water containing a little dilute sulfuric acid. The solution is then made weakly acidic and stirred. A good yield of product is obtained, melting around 220° C. with decomposition.

EXAMPLE 40

*2,4-dimethoxybenzoylbiuret*

A mixture of 10 parts of the above prepared 2,4-dimethoxybenzoyldicyandiamide, 12 parts of ethyl alcohol, 140 parts of water and 6 parts of 99% sulfuric acid is heated to 98–100° C. to form the biuret, while the alcohol is distilled out. The product is then cooled, filtered and washed. A good yield is obtained. It melts around 212° C. with decomposition.

EXAMPLE 41

*2,4-dimethoxybenzoguanamide*

A mixture of 8.3 parts of the above prepared 2,4-dimethoxybenzoylbiuret and 5.0 parts of sodium hydroxide in 100 parts of water is stirred at temperatures up to around 40° C. to complete the ring closure. The solution is then filtered and the product precipitated by careful acidification. A good yield is obtained, the product melting around 254° C. with decomposition.

EXAMPLE 42

*2,4-dimethoxyphenol dichlorotriazine*

A mixture of 3.2 parts of the above prepared 2,4-dimethoxybenzoguanamide, 6.3 parts of phosphorus pentachloride, and 25 parts of phosphorus oxychloride is stirred and refluxed to complete the chlorination and then cooled. The reaction mixture is drowned in about 500 parts of ice and water, stirred thoroughly, and filtered. A good yield of product is obtained, which may be purified, if desired, by extraction with benzene and evaporation to dryness. The melting point is approximately 171° C.

EXAMPLE 43

A mixture of 1.4 parts of the above prepared 2,4-dimethoxyphenyldichlorotriazine, 2.2 parts of alpha-aminoanthraquinone, and 36 parts of nitrobenzene is stirred and heated at 110–115° C. until condensation is complete. The product is filtered and washed with nitrobenzene followed by alcohol. A good yield is obtained.

EXAMPLE 44

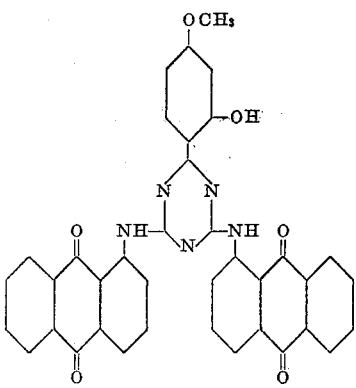

A slurry of 2.1 parts of the product of the preceding example in 26 parts of o-dichlorobenzene is heated and stirred at approximately 140° C. until demethylation of the o-alkoxy group is complete, while being treated with a stream of dry hydrogen bromide. The product is then filtered and washed with o-dichlorobenzene followed by ethyl alcohol. An excellent yield is obtained. It gives bright yellow dyeings from a claret vat.

In the formula given, the methoxy group ortho to the triazine is shown as demethylated, the product obtained in this example being a triazine vat dye having said formula. The preparation of the o-hydroxyphenyl compound by demethylation is not claimed in the present application, but forms the subject matter of our copending application Serial No. 227,941, filed May 23, 1951.

EXAMPLE 45

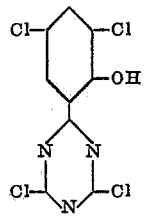

120 parts of 2-(2'-hydroxyphenyl)-4,6-dichloro-1,3,5-triazine is dissolved in 4,000 parts of carbon tetrachloride. 5 parts of iron powder is added and at 30° C. a slow stream of chlorine is passed through the mass. After several hours, the temperature is raised to 50° C. and the introduction of chlorine is continued at this temperature until two chlorine atoms have been introduced. The solvent is removed by distillation and the crude chlorinated product is recrystallized from 1,900 parts of methylcyclohexane. Pale yellow needle-like crystals were obtained.

EXAMPLE 46

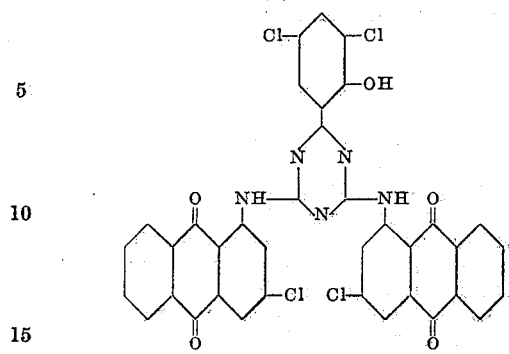

32 parts of 2-(3,5-dichloro-2-hydroxyphenyl)-4,6-dichloro-1,3,5-triazine and 52 parts of 3-chloro-1-aminoanthraquinone are added to 900 parts of dichlorobenzene and the mass is heated gradually to 125° C. It is stirred at 125–130° C. until the reaction is substantially complete. The thick yellow slurry which forms is cooled to about 50° C. The dye which separates out is filtered, washed with nitrobenzene and alcohol or washed with nitrobenzene and the nitrobenzene removed by steaming. The product is then dried at 60 to 70° C. giving a bright yellow product. It dissolves in concentrated sulfuric acid with a yellow color and dyes cellulosic fibers from a red vat in bright greenish yellow shades which have excellent fastness properties.

EXAMPLE 47

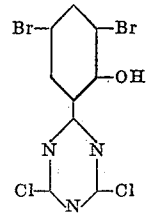

The procedure of Example 45 is followed except that instead of passing in a slow stream of chlorine an excess of bromine is added. The corresponding 2-(3',5'-dibromo-2'-hydroxyphenyl)-4,6-dichloro-1,3,5-triazine is prepared.

EXAMPLE 48

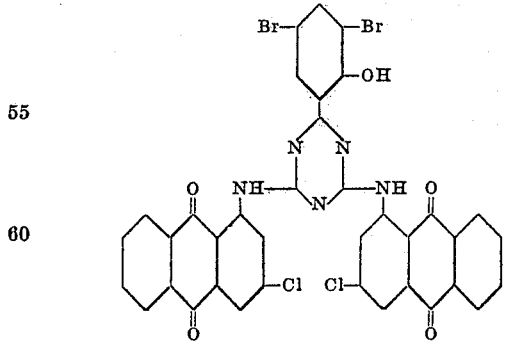

The procedure of Example 46 is followed using however, the product of Example 47 instead of the product of Example 45. The product is a yellow dyestuff which dyes cellulosic material a yellow which is somewhat redder than the shade obtained by dyeing with the product of Example 46.

This application is in part a continuation of our copending application Serial No. 227,942, filed May 23, 1951, now abandoned.

We claim:
1. A vat dye of the formula

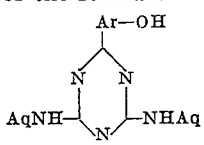

in which Ar is an o-arylene radical and Aq is an alpha-anthraquinonyl radical.

2. A vat dye according to claim 1 in which the o-arylene radical Ar is an o-phenylene radical.

3. A vat dye according to claim 2 in which the alpha-anthraquinonyl radical is unsubstituted.

4. Vat dyes of the formula

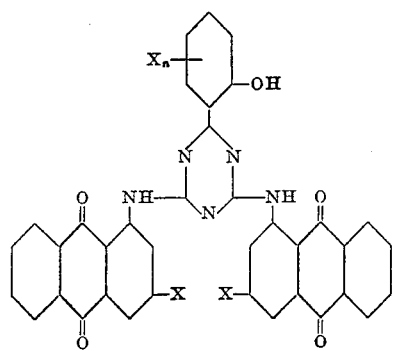

in which X is selected from the group consisting of hydrogen and chlorine and $n$ is a positive integer less than 3.

5. A vat dye of the formula

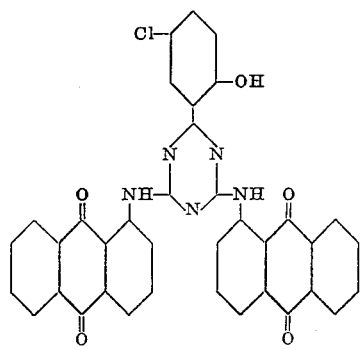

6. A vat dye according to claim 1 in which the o-arylene radical, and Aq is an alpha-anthraquin- and the alpha-anthraquinonyl radical is trinuclear.

7. A vat dye according to claim 6 in which the alpha-anthraquinonyl radicals are

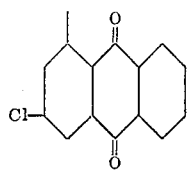

8. A vat dye having the formula

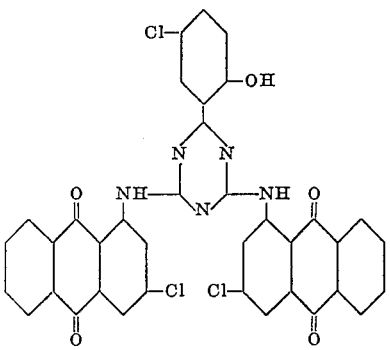

9. A vat dye having the formula

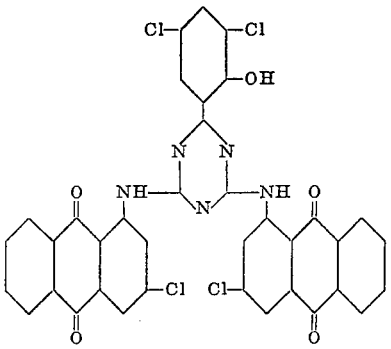

10. A vat dye of the formula

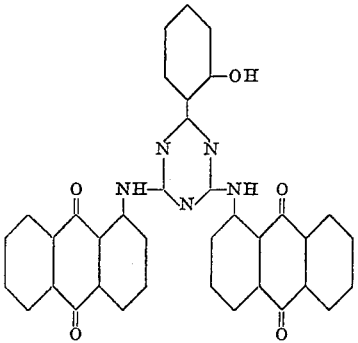

11. A vat dye of the formula

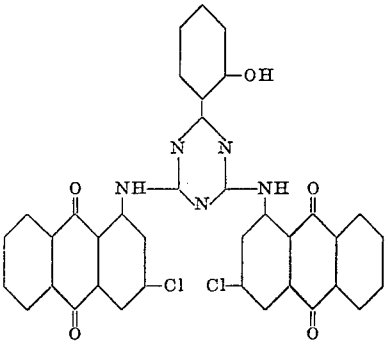

12. A vat dye of the formula

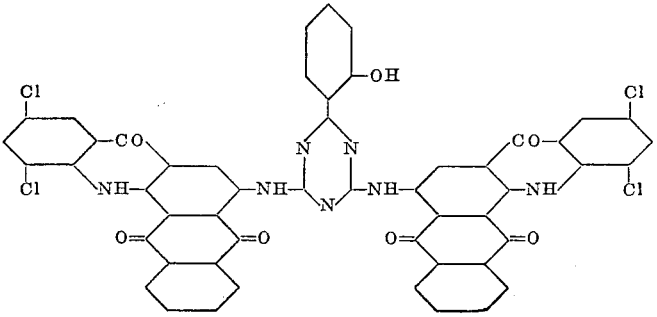

13. A process of preparing a compound according to claim 1 by dealkylating a compound of the formula

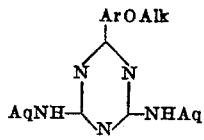

in which Alk is a lower alkyl radical, Ar is an o-arylene radical, and Aq is an alpha-anthraquinonyl radical, by treatment with a hydrogen halide of molecular weight above 20 in an inert organic solvent at a temperature from 100 to 200° C.

14. As a new method of preparing the vat dyes which comprises heating a 2-o-alkoxyaryl-4,6- dianthraquinonylamino triazine compound having the following formula

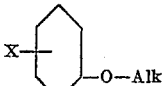
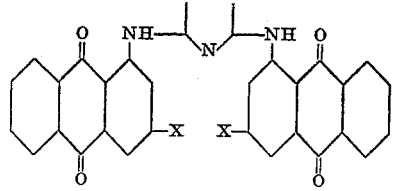

wherein Alk is a lower alkyl radical and X represents a substituent selected from the group consisting of chlorine and hydrogen, with a hydrogen halide of molecular weight above 20 in an organic solvent at a temperature from 100 to 200° C. until the ortho alkoxy group of said triazine compound is dealkylated.

No references cited.